United States Patent
Chen et al.

(10) Patent No.: US 12,476,713 B2
(45) Date of Patent: Nov. 18, 2025

(54) FABRICATION TOLERANT WAVELENGTH DEMULTIPLEXER RECEIVER

(71) Applicant: Cisco Technology, Inc., San Jose, CA (US)

(72) Inventors: Long Chen, Marlboro, NJ (US); Qianfan Xu, San Jose, CA (US); Jonathan Edgar Roth, San Mateo, CA (US)

(73) Assignee: Cisco Technology, Inc., San Jose, CA (US)

( * ) Notice: Subject to any disclaimer, the term of this patent is extended or adjusted under 35 U.S.C. 154(b) by 227 days.

(21) Appl. No.: 18/325,933

(22) Filed: May 30, 2023

(65) Prior Publication Data

US 2024/0405883 A1  Dec. 5, 2024

(51) Int. Cl.
*H04B 10/00* (2013.01)
*H04B 10/294* (2013.01)
*H04B 10/50* (2013.01)
*H04B 10/61* (2013.01)
*H04J 14/00* (2006.01)

(52) U.S. Cl.
CPC ......... *H04B 10/614* (2013.01); *H04B 10/294* (2013.01); *H04B 10/506* (2013.01)

(58) Field of Classification Search
CPC .... H04B 10/66; H04B 10/67; G02B 6/12007; G02B 6/12023
See application file for complete search history.

(56) References Cited

U.S. PATENT DOCUMENTS

2005/0158047 A1 * 7/2005 Way ............... H04J 14/0205
                                              398/59
2016/0209590 A1 * 7/2016 Kato .............. G02B 6/2773
2016/0246005 A1 * 8/2016 Liu ............... G02B 6/126

* cited by examiner

*Primary Examiner* — Daniel G Dobson
(74) *Attorney, Agent, or Firm* — Patterson + Sheridan, LLP

(57) ABSTRACT

A receiver comprises at least two input ports. An optical signal containing n wavelengths is coupleable to one of these input ports. The receiver comprises a first demultiplexer coupled to a first input port to separate n wavelengths in the first input port onto n first multiplexer output ports, a second demultiplexer coupled to a second input port to separate the n wavelengths in the second input port onto n second multiplexer output ports, and a waveguide crossing matrix comprising an input side and an output side. The crossing matrix coupled to the n first and the n second multiplexer output ports on the input side and coupled to n shared photodetectors on the output side, one for each wavelength channel. Each of the photodetectors is coupled to one of the n first multiplexer output ports and one of the n second multiplexer output ports for the one wavelength channel.

20 Claims, 5 Drawing Sheets

FABRICATION TOLERANT WAVELENGTH DEMULTIPLEXER RECEIVER

FIELD

This disclosure relates generally to the field of passive receivers for wavelength division multiplexing applications.

SUMMARY

In part, in one aspect, the disclosure relates to a receiver comprising at least two input ports, wherein an optical signal containing n wavelengths is coupleable to only one of these input ports, wherein n>1. The receiver comprises a first demultiplexer coupled to a first input port to separate n wavelengths in the first input port onto n first multiplexer output ports, a second demultiplexer coupled to a second input port to separate the n wavelengths in the second input port onto n second multiplexer output ports, and a waveguide crossing matrix comprising an input side and an output side, the waveguide crossing matrix coupled to the n first multiplexer output ports and the n second multiplexer output ports on the input side and coupled to n shared photodetectors on the output side, one for each wavelength channel. Each one of the n photodetectors is coupled to one of the n first multiplexer output ports for one wavelength channel and is coupled to one of the n second multiplexer output ports for the one wavelength channel.

In part, in one aspect, the disclosure relates to a method of operating a receiver, the method comprising receiving, from an optical fiber coupled to an input, an optical signal comprising n wavelengths, splitting the optical signal based on a polarization of the optical signal into a first optical signal with a first polarization and a second optical signal with a second polarization, demultiplexing, by a first demultiplexer, the first optical signal into n first outputs for each of the n wavelengths, demultiplexing, by a second demultiplexer, the second optical signal into n second outputs for each of the n wavelengths, routing each of the n first outputs and the n second outputs to n shared photodetectors, wherein each photodetector of the n shared photodetectors receives a first output of the first n outputs and a second output of the n second outputs, wherein the first output and the second output comprise the same wavelength, combining one of the first n outputs with a first wavelength and one of the n second outputs with the first wavelength at a photodetector of the n shared photodetectors into a combined signal, and photodetecting the combined signal.

Although, the disclosure relates to different aspects and embodiments, it is understood that the different aspects and embodiments disclosed herein can be integrated, combined, or used together as a combination system, or in part, as separate components, devices, and systems, as appropriate. Thus, each embodiment disclosed herein can be incorporated in each of the aspects to varying degrees as appropriate for a given implementation. Further, the various apparatus, optical elements, passivation coatings/layers, optical paths, waveguides, splitters, couplers, combiners, electro-optical devices, inputs, outputs, ports, channels, components and parts of the foregoing disclosed herein can be used comprising laser, laser-based communication system, waveguide, fiber, transmitter, transceiver, receiver, and other devices and systems without limitation. These and other features of the applicant's teachings are set forth herein.

BRIEF DESCRIPTION OF THE FIGURES

Unless specified otherwise, the accompanying drawings illustrate aspects of the innovations described herein. Referring to the drawings, wherein like numerals refer to like parts throughout the several views and this specification, several embodiments of presently disclosed principles are illustrated by way of example, and not by way of limitation. The drawings are not intended to be to scale. A more complete understanding of the disclosure may be realized by reference to the accompanying drawings in which.

DETAILED DESCRIPTION

Figure 1:
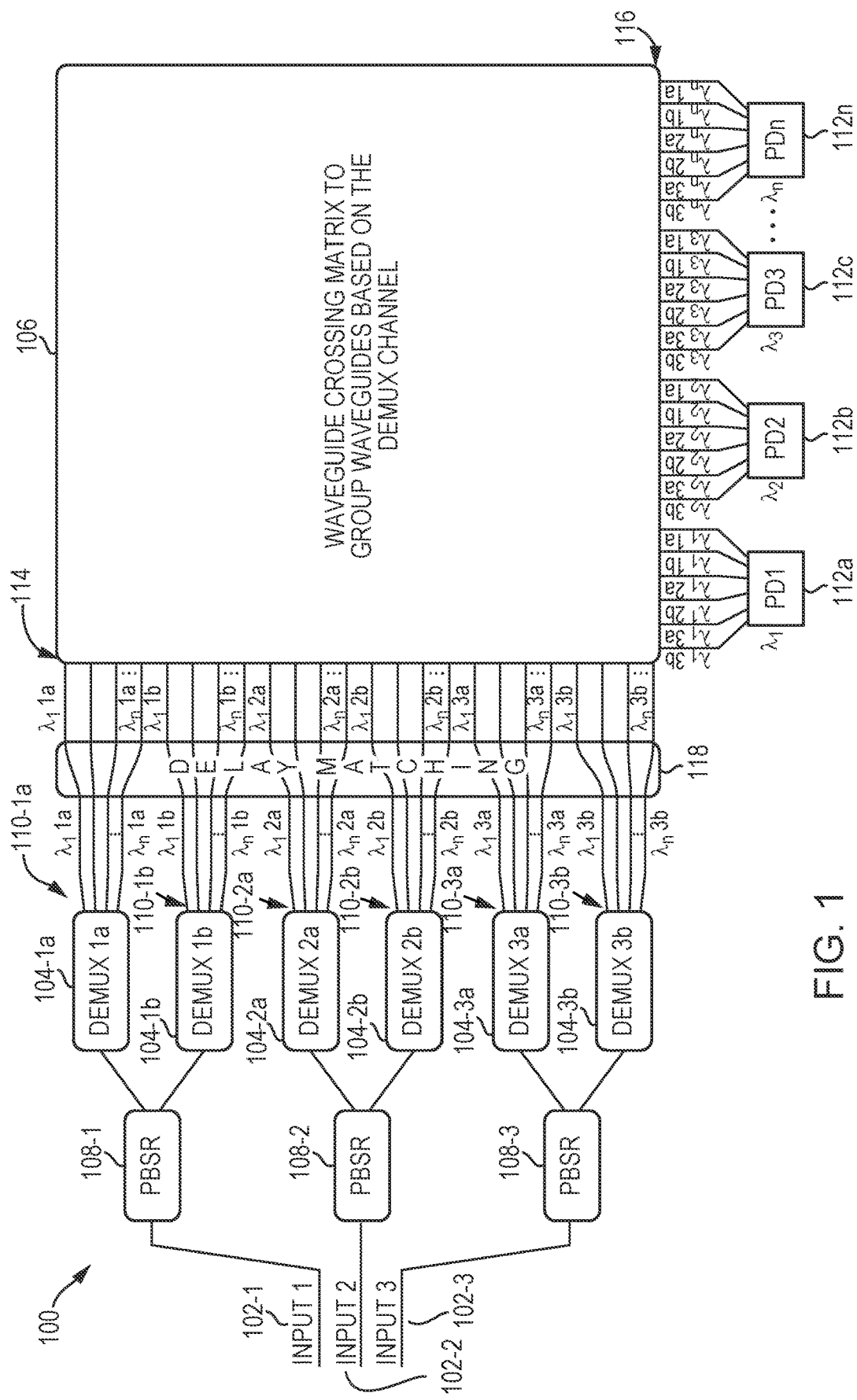
FIG. 1 is a receiver according to an exemplary embodiment of the disclosure.

An integrated wavelength demultiplexer on sub-micron-thickness silicon or silicon nitride waveguide platforms is challenging due to fabrication variations in the waveguide dimensions, particularly the waveguide thickness. Such demultiplexers can be made of Mach-Zehnder interferometers, arrayed waveguide gratings, Bragg gratings, echelle gratings, ring or disk resonators, etc. The spectral response of the demultiplexer is often determined by the refractive index of the optical mode of the waveguides used in the demultiplexer. In sub-micron-thickness silicon or silicon nitride waveguide platforms, the waveguide thickness can be in the range of 100~500 nm. In some embodiment of silicon waveguides, the thickness is about 220 nm or less. In some embodiment of silicon nitride waveguides, the thickness is about 250 nm or less. Those values are substantially smaller than the operating optical wavelengths, such as when the wavelengths are 1300 nm or 1550 nm. Thus, the optical mode and its refractive index are strongly confined. The optical mode and refractive index, and, as a result, the demultiplexer spectral response, are sensitive to even small changes in the thickness. For example, in some embodiments, a wavelength demultiplexer around 1550 nm wavelength with silicon waveguides of 500 nm width and 220 nm thickness embedded in silicon dioxide cladding can have a wavelength shift of approximately 2 nm for every 1 nm change in the silicon thickness. Similarly, a wavelength demultiplexer with silicon nitride waveguides of 1000 nm width and 250 nm thickness embedded in silicon dioxide cladding can have a wavelength shift of 0.5 nm for every 1 nm change in the silicon nitride thickness. Therefore, even a thickness variation of 2.5 nm in silicon waveguides or 10 nm in silicon nitride waveguides, which are challenging to achieve across wafers and lots with modern fabrication capabilities, can lead to wavelength shifts as much as 5 nm. Additional sensitivity to waveguide width and chip temperature will increase the wavelength shift further, making it unsuitable for many wavelength division multiplexing applications where the requirement for wavelength accuracy is better than 5 nm.

To address this problem, prior solutions mostly rely on active controls. These include designs such as (1) demultiplexers with electrical (including thermos-optical) tuning, and (2) multiple copies of passive demultiplexers combined with active optical switches before and after the demultiplexers to select which one to use.

The exemplary disclosure is directed to a passive receiver design. The receiver has multiple copies of demultiplexers to handle fabrication variation. These demultiplexers are designed to have spectral responses that are different from each other under a certain set of fabrication conditions (in waveguide width, thickness, refractive index, etc.). At least one of these demultiplexer would yield desirable spectral responses as the fabrication conditions vary, which would be selected to receive the optical signals. Such selection is done, at the input side, by selecting which physical port to use during an assembly step, such as during the fiber attach. Additionally, this eliminates active optical switches at the demultiplexer output side by grouping the channels together through a low-loss waveguide crossing matrix and feeding multiple waveguides into shared waveguide-integrated photodetectors. In one aspect, the waveguide crossing matrix has 0.02 dB insertion loss and less than-60 dB crosstalk per crossing.

FIG. 1 is a receiver 100 according to an exemplary embodiment of the disclosure. The receiver 100 comprises a first demultiplexer 104-1a, a second demultiplexer 104-1b, and a waveguide crossing matrix 106. The first demultiplexer 104-1a is coupled to a first input port 102-1 and the first demultiplexer 104-1a is to separate n wavelengths in the first input port 102-1 onto n first multiplexer output ports 110-1a. The value of n is greater than 1. The second demultiplexer 104-1b is coupled to the first input port 102-1 and the second demultiplexer 104-1b is to separate the n wavelengths in the first input port 102-1 onto n second multiplexer output ports 110-1b.

The waveguide crossing matrix 106 comprises an input side 114 and an output side 116. The waveguide crossing matrix 106 is coupled to the n first multiplexer output ports 110-1a and the n second multiplexer output ports 110-1b on the input side 114. The waveguide crossing matrix 106 is coupled to n shared photodetectors 112 on the output side 116. The waveguide crossing matrix 106 comprises a plurality of wavelength channels that route the outputs of the demultiplexers 104 to the photodetectors 112. The n shared photodetectors 112 have one photodetector for each wavelength channel. Each one of the n photodetectors is coupled to one of the n first multiplexer output ports 110-1a for one wavelength channel and is coupled to one of the n second multiplexer output ports 110-1b for the one wavelength channel. For example, the first demultiplexer 104-1a has an output for a wavelength and the second demultiplexer 104-1b has an output for the same wavelength. These outputs are routed to the same photodetector.

In one aspect, the receiver 100 comprises a plurality of input ports 102-1, 102-2, 102-3. The plurality of input ports 102-1, 102-2, 102-3 comprise at least one input port. As shown in FIG. 1, the receiver 100 comprises a first input port 102-1, a second input port 102-2, and a third input port 102-3. The receiver can comprise any number of input ports 102-p. The receiver is to receive an optical signal from a optic cable. At least one of the input ports of the plurality of input ports 102-1, 102-2, 102-3 is coupled to a fiber optic cable and is to receive the optical signal. The optical signal may comprise n wavelengths. Any of the input ports 102-1, 102-2, 102-3 can be coupled to a fiber optic cable to receive the optical signal.

In many applications, the optical signal from the fiber optical cable has a polarization that is unknown and/or varying over time. This is true for most communication fibers which are not special polarization-maintaining fibers. In some cases, the integrated receiver circuit, including the demultiplexers, the waveguide crossing matrix, and the photodetectors, can handle the varying polarization directly. These are often called "polarization independent" circuits. In many cases, however, it is very difficult to construct such "polarization independent" circuits, particularly "polarization independent" demultiplexers where the spectral responses are nearly the same for random polarizations. Alternatively, in one aspect, the receiver circuit uses a polarization diversity scheme. Note that a signal of any random polarization can be treated as the sum of two signals of orthogonal polarizations, with proper ratio in their relative power and phases. So a polarization diversity receiver is designed to separate the original signal into two signals of known and orthogonal polarizations and detect these two signals and add them together properly to recover the original signal.

FIG. 1 shows an example of such polarization diversity scheme. Each input port of the plurality of input ports is coupled to two demultiplexers, a first demultiplexer for a first polarization of an optical signal and a second demultiplexer for a second polarization of the optical signal. As shown in FIG. 1, the first input port 102-1 is coupled to a first demultiplexer 104-1a and a second demultiplexer 104-1b. The second input port 102-2 is coupled to a third demultiplexer 104-2a and a fourth demultiplexer 104-2b. The third input port 102-3 is coupled to a fifth demultiplexer 104-3a and a sixth demultiplexer 104-3b. It is contemplated by this disclosure, that additional p input ports would be coupled to (p+1) and (p+2) demultiplexers, and so on, without limitation in this context.

In one aspect, the receiver 100 comprises a plurality of polarization beam splitter and rotators (PBSR) 108. Each input port 102-1,2,3 is coupled to a PBSR 108. For example, the receiver 100 in FIG. 1 comprises a first PBSR 108-1 comprising an input coupled to the first input port 102-1 and a first output coupled to the first demultiplexer 104-1a and a second output coupled to the second demultiplexer 104-1b. As shown in FIG. 1, the receiver comprises a second PBSR 108-2 comprising an input coupled to the second input port 102-2 and first output coupled to the third demultiplexer 104-2a and a second output coupled to the fourth demultiplexer 104-2b. Additionally, the receiver comprises a third PBSR 108-3 comprising an input coupled to the second input port 102-3 and a first output coupled to the fifth demultiplexer 104-3a and a second output coupled to the sixth demultiplexer 104-3b. It is contemplated by this disclosure, that additional PBSRs would have an input coupled to a p input port and a first output coupled to an input of a (p+1) demultiplexer and a second output coupled to a (p+2) demultiplexer, and so on, without limitation in this context.

The PBSR splits the optical signal received at a PBSR input coupled to a input port into two polarized signals, a first signal at a first polarization of the optical signal is provided at a first output and a second signal at a second polarization of the optical signal provided at a second output. The second polarization is rotated to have the same polarization as the first signal. For example, imagine an optical signal can be decomposed to a first signal of transverse-electric (TE) polarization and a second signal of transverse-magnetic (TM) polarization. In one embodiment of PBSR the first signal (the TE portion) is sent out at the first output as a TE-polarized signal, the second signal (the TM portion) is sent out at the second output as a TE-polarized signal as well. Therefore, all signals after the PBSRs are of the same TE polarization, which can be of considerable benefits in some applications.

In the example illustrated in FIG. 1, the first, third, and fifth demultiplexers 104-1a, 104-2a, 104-3a are coupled to the first outputs of the PBSRs 108-1, 108-2, 108-3, respectively, and receive the first signal at the first polarization. Still referring to the example illustrated in FIG. 1, the second, fourth, and sixth demultiplexers 104-1b, 104-2b, 104-3b are coupled to the second outputs of the PBSRs 108-1, 108-2, 108-3, respectively, and receive the second signal at the second polarization. In one embodiment, the demultiplexer 104-1b is an identical copy of the demultiplexer 104-1a. Similarly, demultiplexer 104-2b can be an identical copy of demultiplexer 104-2a, and demultiplexer 104-3b can be an identical copy of demultiplexer 104-3a. For example, the first PBSR 108-1 is coupled between the first selectable input 102-1 and the first and second demultiplexer 104-1a, 104-1b. The optical signal is sent through the first input 102-1 and into the PBSR 108-1. The first PBSR 108-1 splits the optical signal from the first input port 102-1 into a first signal at a first polarization of the optical signal at a first output and a second signal at a second polarization of the optical signal at a second output. The PBSR 108-1 polarizes the second signal such that the second polarization is at the same polarization as the first polarization.

Each demultiplexer 104-1a,b, 104-2a,b, 104-3a,b has n multiplexer output ports 110 corresponding to the n wavelengths present in the input ports 102-1, 102-2, 102-3. Each of the n output ports 110-1a, 110-1b, 110-2a, 110-26, 110-3a, 110-3b corresponds to a different wavelength $\lambda_1, \lambda_2, \lambda_3, \ldots, \lambda_n$, of the optical signal. Each demultiplexer 104-1a,b, 104-2a,b, 104-3a,b is configured to split the optical signal at its input based on the number of wavelengths of the optical signal. Each demultiplexer 104-1a,b, 104-2a,b, 104-3a,b splits the signal at its input into n signals, one for each wavelength. As shown in FIG. 1, the first demultiplexer 104-1a has an output ports 110-1a. Each output within the n output ports 110-1a corresponds to one of the n wavelengths in the optical signal. The second demultiplexer comprises a n output ports 110-1b, wherein each output corresponds to one of the plurality of wavelengths in the optical signal.

For example, the first input port 102-1 is coupled to the first demultiplexer 104-1a and the second demultiplexer 104-1b. The first demultiplexer has n output ports 110-1a. The n output ports correspond to the n wavelengths within the optical signal. The second demultiplexer 104-1b splits the optical signal into n signals, one for each wavelength. The second demultiplexer 104-1b has n output ports 110-1b.

FIG. 1 is an example of using a PBSR to separate an optical signal of unknown and/or varying polarizations in to two signals and to rotate the polarization of the second signal to have the same polarization as the first signal. This allows all signals after the PBSR to be of a single polarization and considerably simplifies the receiver design. In an alternative embodiment, a polarization beam splitter (PBS) without the extra rotator function is used in place of the PBSR. For example, the two signals at the two outputs of the PBS would have orthogonal polarizations. As a result, demultiplexer 104-1a would be designed for the first polarization, and demultiplexer 104-1b would be designed for the second polarization that is orthogonal to the first polarization.

Figure 2:
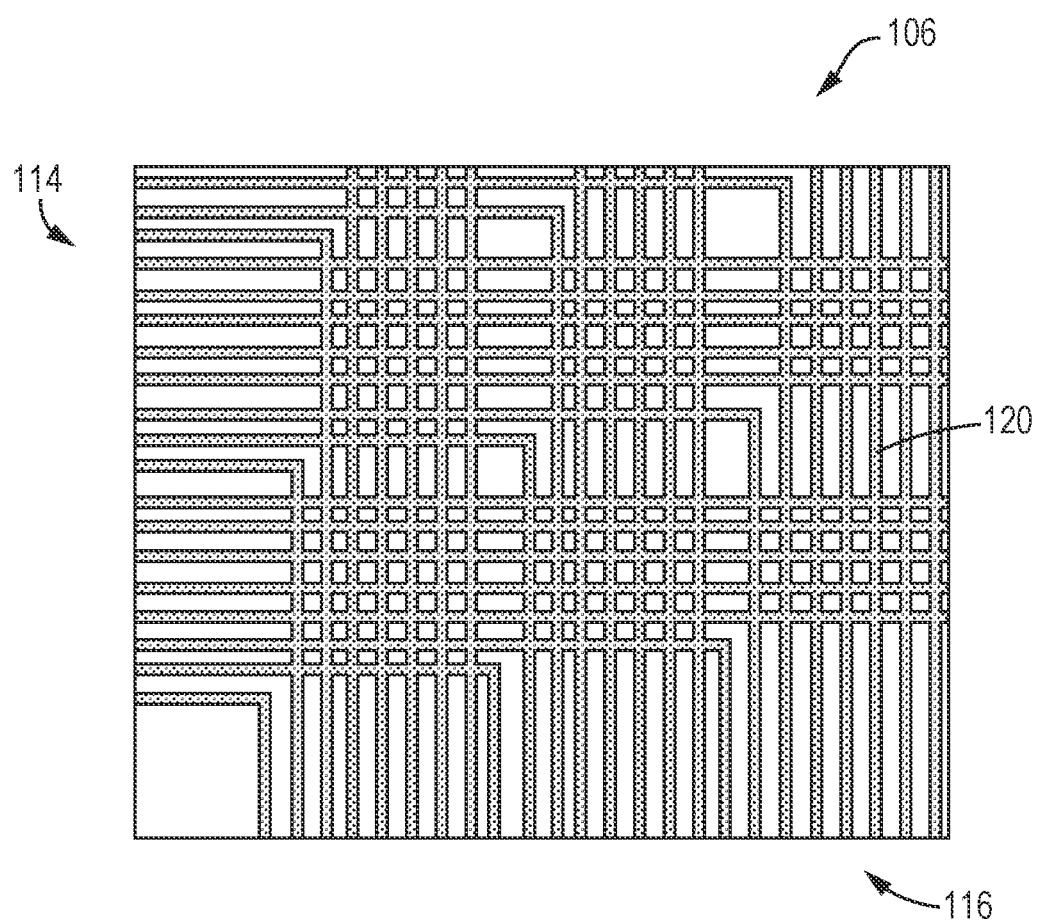
FIG. 2 is a waveguide crossing matrix according to an exemplary embodiment of the disclosure.

Each of the n outputs of the demultiplexer output ports 110-1a, 110-1b, 110-2a, 110-2b, 110-3a, 110-3b is coupled to a waveguide of the waveguide crossing matrix 106. FIG. 2 is a waveguide crossing matrix 106 according to an exemplary embodiment of the disclosure. The waveguide crossing matrix comprises a plurality of waveguides 120. The waveguide comprises an input side 114 coupled to each of the demultiplexers output ports 110-1a, 110-1b, 110-2a, 110-2b, 110-3a, 110-3b and an output side coupled to the n shared photodetectors 112. The waveguide crossing matrix comprises a number of waveguides equal to 2n*number of input ports. For example, each of the n outputs of each of the demultiplexers is coupled to a waveguide 120.

There are two types of features inside the crossing matrix. A waveguide can either go straight (either horizontally or vertically) and cross other waveguides going the orthogonal direction, or make a turning between the horizontal and vertical direction. As shown in FIG. 2, the turnings are illustrated with abrupt 90 degree turns for the sake of simplicity. In many embodiments the turnings are implemented through smooth waveguide bends of sufficient radius to avoid excessive bending loss. The waveguides are illustrated as having uniform width for simplicity. In many embodiments the waveguide widths would be varied considerably inside the matrix. For example, the straight routing and crossing portion could be using waveguides of sufficiently large width to minimize the insertion loss of the crossing. The turning/bending portion can be waveguides of sufficiently small width to ensure single mode and reduce the chance of excitation of undesired higher order modes. Smooth tapering is used to connect such wide and narrow waveguides. For example, the waveguides can be 6 μm wide during the straight routing, and 0.5 μm wide during the turning/bending. The bending radius can be 30 μm or more. The separation of waveguides can be 50 μm or more.

Each waveguide 120 is routed to a single photodetector 112a, 112b, 112c, . . . , 112n. Each photodetector 112a, 112b, 112c, . . . , 112n is to receive one wavelength. There are n photodetectors such that each wavelength is sent to one photodetector. As shown, in the implementation of polarization diversity scheme, the photodetector is to receive the decomposed two signals for a single wavelength. These two signals are of different polarizations if a PBS is used, or these two signals are originally of different polarizations but converted to the same polarization if a PBSR is used. For example, the first photodetector 112a is coupled to an output from the first demultiplexer 104-1a for a wavelength at a first polarization and to an output from the second demultiplexer 104-1b for the same wavelength at a second polarization. In addition, the first photodetector 112a is coupled to an output from the third demultiplexer 104-2a, fourth demultiplexer 104-2b, fifth demultiplexer 104-3a, and sixth demultiplexer 104-3b for the same wavelength. The first signal with the first polarization and a wavelength and the second signal with the second polarization and the wavelength are combined at a photodetector of the n shared photodetectors corresponding to the wavelength.

In one aspect, the receiver 100 comprises a delay matching circuit 118 to delay the output from the first demultiplexer 104-1a and the output from the second demultiplexer 104-1b, such that the output from the first demultiplexer 104-1a and the output from the second demultiplexer 104-1b are arriving at the photodetectors simultaneously.

As shown in FIG. 1, the signal going into demultiplexer 104-1a and the signal going into demultiplexer 104-1b are separated from the same signal before the PBSR through the polarization diversity scheme, and outputs from demultiplexer 104-1a and outputs from demultiplexer 104-1b are combined in the same photodetector for a same wavelength.

Therefore, it is critical to match the two optical paths of the polarization diversity circuit so that overall delay is identical. Otherwise, the original signal before the PBSR cannot be properly recovered. In many applications, it is only important to match the relative delays of the two signals coming from the input same input port and being of the same wavelength as a pair. The delay of one pair can be the same or different for another pair.

For example, the first wavelength $\lambda_1$-1a from demultiplexer 104-1a and the first wavelength $\lambda_1$-1b from demultiplexer 104-1b, both of which are connected to the input port 102-1, need to be matched. Similarly, $\lambda_2$-1a and $\lambda_2$-1b need to be matched with each other, $\lambda_1$-2a and $\lambda_1$-2b need to be matched with each other. The total delay matters, so the delay matching component can be placed arbitrarily, before the demultiplexers, after the demultiplexers but before the crossing matrix, inside the crossing matrix, after the crossing matrix and before the photodetectors, or the delay matching component can be distributed in multiple locations to ensure matching of total path length delay.

As shown in FIG. 1, the third demultiplexer 104-2a, fourth demultiplexer 104-2b, fifth demultiplexer 104-3a, and sixth demultiplexer 104-3b are also coupled to the delay matching circuit 118. The delay matching circuit delays the output from the third demultiplexer 104-2a and fourth demultiplexer 104-2b such that the output from the third demultiplexer 104-2a and the output from the fourth demultiplexer 104-2b are output simultaneously. The delay matching circuit 118 functions in the same manner for the fifth and sixth demultiplexer 104-3a,b as the first and second demultiplexer 104-1a,b and the third and fourth demultiplexer 104-2a,b.

For example, the first input port 102-1 is coupled to a fiber optic cable to receive the optical signal comprising n wavelengths. The first demultiplexer 104-1a is to receive a first polarization of the optical signal. The second demultiplexer 104-1b is to receive a second polarization of the optical signal. In one aspect, the first PBSR 108-1 splits the optical signal into a first signal with the first polarization of the optical signal to send to the first demultiplexer 104-1a and a second signal with the second polarization of the optical signal to send to the second demultiplexer 104-1b. The first demultiplexer 104-1a is to receive the first signal for the first polarization of the optical signal from the first PBSR 108-1 and the second demultiplexer 104-1b is to receive the second signal for the second polarization of the optical signal from the first PBSR 108-1. The first demultiplexer 104-1a splits the optical signal into n signals, one for each wavelength. The second demultiplexer 104-1b splits the optical signal into n signals, one for each wavelength. An output with a first wavelength from the first demultiplexer output ports 110-1a and an output with the first wavelength from the second demultiplexer output ports 110-1b couples to a photodetector of the n photodetectors. For example, each output from the first demultiplexer 104-1a couples to a different photodetector of the plurality of photodetectors 112a, 112b, 112c, ..., 112n and each output from the second demultiplexer 104-1b couples to a different photodetector, wherein each photodetector receives at least two outputs of the same wavelength.

The waveguide routing matrix 106 couples the n output ports of each demultiplexer to the n photodetectors. Each demultiplexer has n output ports and each output port is coupled to a different photodetector. For example, as shown in FIG. 1, the first demultiplexer 104-1a has four outputs corresponding to the four wavelengths of the optical signal. The second demultiplexer 104-1b has four outputs corresponding to the four wavelengths of the optical signal. The first multiplexer 104-1a couples each output to a different photodetector based on wavelength. The second demultiplexer 104-1b couples each output to the corresponding photodetector for each wavelength. The first demultiplexer 104-1a outputs the four wavelengths with the first polarization. The second demultiplexer 104-1b outputs the four wavelengths with the second polarization. Each photodetector 112 receives a signal with a first polarization and a second polarization of a single wavelength. Thus, the photodetector 112 receives the entirety of the signal at a single wavelength. The term of first polarization and second polarization are referring to components of the original signal for the sake of simplicity. In implementation with PBSR, the first polarization and the second polarization are the same polarization.

Multiple input waveguides can be configured to connect to a shared waveguide-integrated photodetector in different ways. For example, they can all come from one side of the photodetector with individual waveguides. The waveguides can be coming at different angles, or parallel to each other. Alternatively, these individual waveguides can be merged into a wide, multimode waveguide first before illuminating the photodetector. The individual waveguides can also be divided into two groups and illuminate the photodetector from two opposite sides. For example, three waveguides on the left and three on the right. They can be grouped arbitrarily. In some implementations, one can group the waveguides from the same pair of demultiplexers (for example, 104-1a and 104-1b) to the same side. Since only one pair of demultiplexers would carry the desired optical signal, it ensures that there is limited chance of optical leakage back to the input port. Similarly, those input waveguides from each side can be placed at different angles, parallel, or be merged into a wide multimode waveguide first before illuminating the photodetector.

The waveguides of the waveguide crossing matrix couple to the photodetectors in different configurations as shown in FIGS. 3A to 3D. FIGS. 3A to 3D illustrate configurations of coupling waveguides to a photodetector. The configurations can be used for any of the photodetectors of the receiver. Each input to the photodetector is coupled to a waveguide. Each demultiplexer has one output routed to a photodetector by a waveguide 120. For example, as shown in FIGS. 3A to 3D, the first demultiplexer 104-1a has an output 1a that routes to the photodetector 112 input waveguide 120-1a. The second demultiplexer 104-1b has an output 1b that routes to the photodetector 112 input waveguide 120-1b. The third demultiplexer 104-2a has an output 2a that routes to the photodetector 112 input waveguide 120-2a. The fourth demultiplexer 104-2b has an output 2b that routes to the photodetector 112 input waveguide 120-2b. The fifth demultiplexer 104-3a has an output 3a that routes to the photodetector 112 input waveguide 120-3a. The sixth demultiplexer 104-3b has an output 3b that routes to the photodetector 112 input waveguide 120-3b.

Figure 3A:
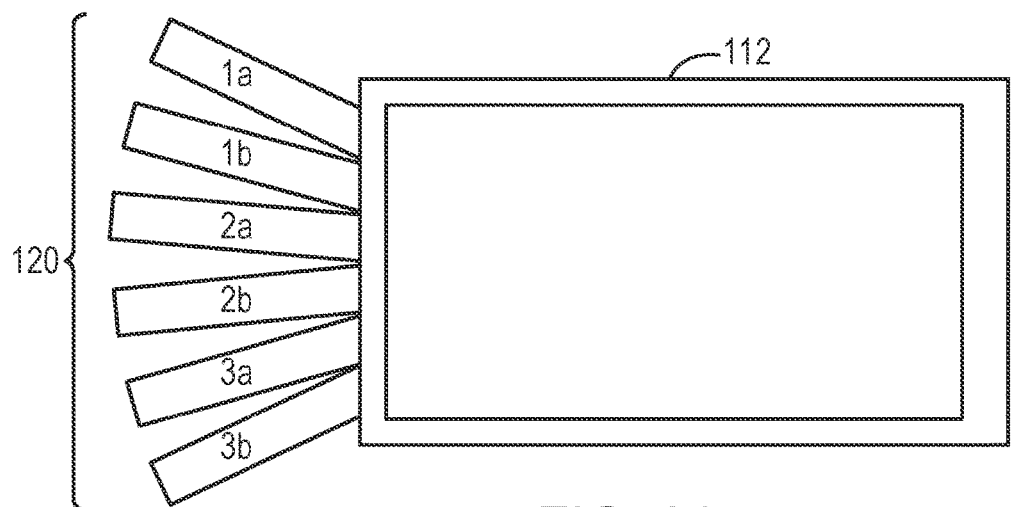
FIG. 3A is a configuration for the waveguide-integrated photodetector with multiple input waveguides according to an exemplary embodiment of the disclosure.

FIG. 3A is a configuration for the waveguide-integrated photodetector 112 with multiple input waveguides 120-1a, 1b, 2a, 2b, 3a, 3b according to an exemplary embodiment of the disclosure. The input waveguides 120-1a, 1b, 2a, 2b, 3a, 3b are coupled on one side of the photodetector 112. In one aspect, all of the waveguides have different incident angles into the waveguide-integrated photodetector. Alternatively, some or all of them could have the same incident angle.

Figure 3B:
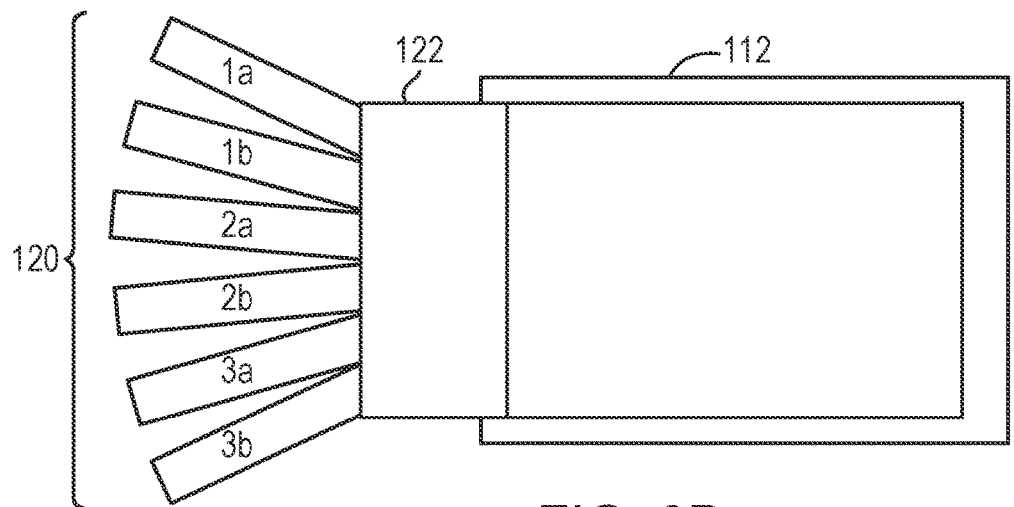
FIG. 3B is a configuration for the waveguide-integrated photodetector with multiple input waveguides according to an exemplary embodiment of the disclosure.

FIG. 3B is a configuration for the waveguide-integrated photodetector 112 with multiple input waveguides 120-1a, 1b, 2a, 2b, 3a, 3b according to an exemplary embodiment of the disclosure. The photodetector 112 further comprises a multimode waveguide 122 positioned between the photodetector 112 and the multiple input waveguides 120-1a, 1b, 2a, 2b, 3a, 3b. A plurality of the input waveguides 120-1a, 1b, 2a, 2b, 3a, 3b of the waveguide crossing matrix 106 are merged into the multimode waveguide 122. The multimode waveguide 122 is coupled between the plurality of input waveguides 120 and the photodetector 112 of the n shared photodetectors. Similarly, the incident angles of the waveguides can be the same or different.

Figure 3C:
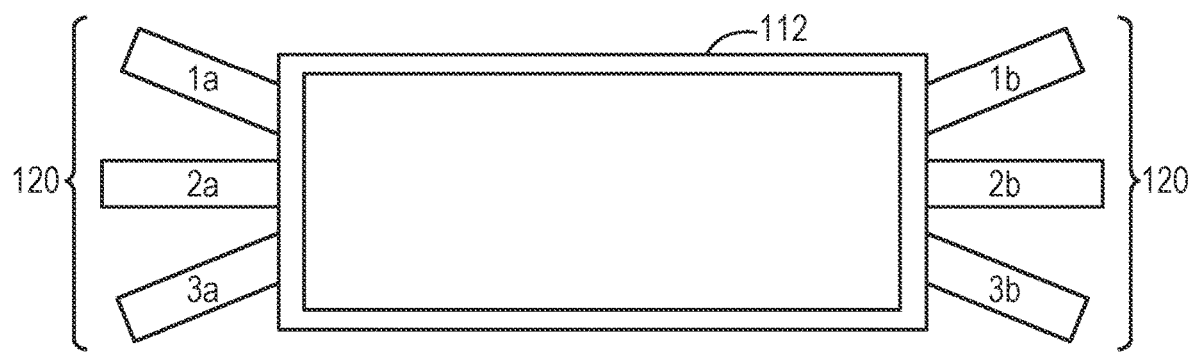
FIG. 3C is a configuration for the waveguide-integrated photodetector with multiple input waveguides according to an exemplary embodiment of the disclosure.

FIG. 3C is a configuration for the waveguide-integrated photodetector 112 with multiple input waveguides 120-1a, 1b, 2a, 2b, 3a, 3b according to an exemplary embodiment of the disclosure. The input waveguides 120-1a, 1b, 2a, 2b, 3a, 3b of the waveguide crossing matrix 106 are divided into two groups for each photodetector 112 based on polarization. A first set of the input waveguides 120-1a, 2a, 3a is located on one side of the photodetector 112 and a second set of the input waveguides 120-1b, 2b, 3b is located on an opposite side of the photodetector 112 such that the input waveguides 120-1a, 1b, 2a, 2b, 3a, 3b illuminate the photodetector 112 from opposite sides in a symmetric configuration. Similarly, the incident angles of the waveguides can be the same or different. Similarly, a merged multimode waveguide can be placed before the waveguide-integrated photodetector.

Figure 3D:
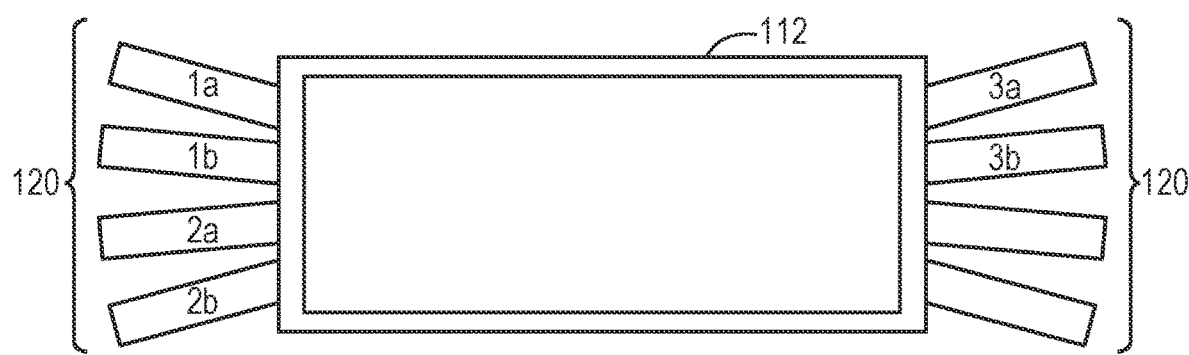
FIG. 3D is a configuration for the waveguide-integrated photodetector with multiple input waveguides according to an exemplary embodiment of the disclosure.

FIG. 3D is a configuration for the waveguide-integrated photodetector 112 with multiple input waveguides 120-1a, 1b, 2a, 2b, 3a, 3b according to an exemplary embodiment of the disclosure. The input waveguides 120-1a, 1b, 2a, 2b, 3a, 3b are divided into two groups, such that the waveguides 120 from the same pair of demultiplexers are on the same side of the photodetector. For example, the first multiplexers 104-1a are coupled to one side of the photodetector 112 and the second multiplexers 104-1b are coupled to the other side of the photodetector 112 in an asymmetric configuration. Similarly, the incident angles of the waveguides can be the same or different. Similarly, a merged multimode waveguide can be placed before the waveguide-integrated photodetector.

In one aspect, in any of the configurations from FIGS. 3A to 3D, the plurality of waveguides of the waveguide crossing matrix couple to the n shared photodetectors at different angles. In one aspect, in any of the configurations from FIGS. 3A to 3D, a plurality of waveguides of the waveguide crossing matrix couple to the n shared photodetectors in a parallel configuration. For example, the first multiplexers 104-1a, second multiplexers 104-1b, third multiplexer 104-2a, and fourth multiplexer 104-2b are coupled to the one side of the photodetector through input waveguides 120-1a, 1b, 2a, 2b and the fifth and sixth multiplexers 104-3a, 3b are coupled to another side of the photodetector 112.

Figure 4:
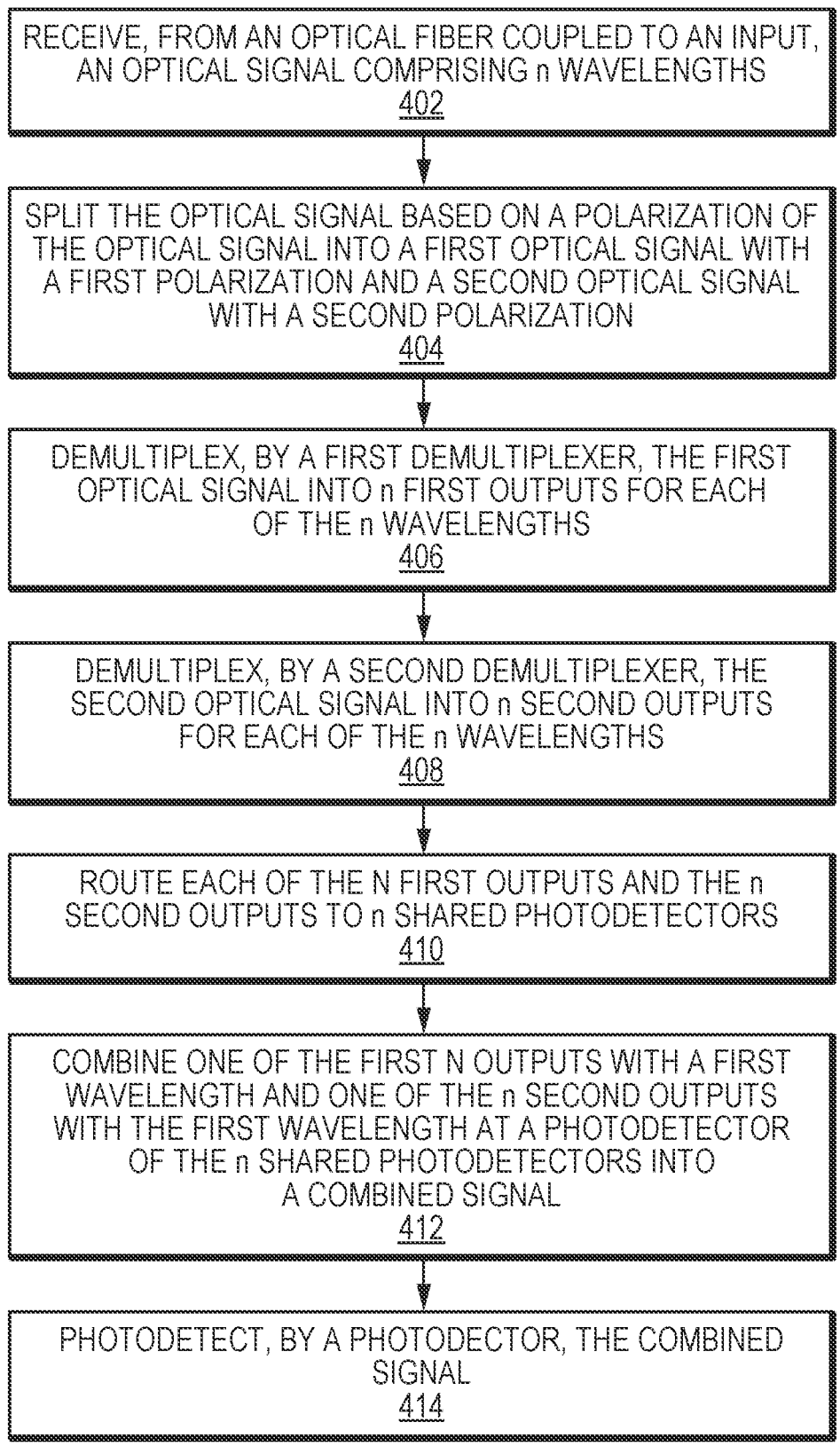
FIG. 4 is a method of operating the receiver according to an exemplary embodiment of the disclosure.

FIG. 4 is a method of operating the receiver 100 according to an exemplary embodiment of the disclosure. The method 400 of operating the receiver 100 comprises receiving 402, from an optical fiber coupled to a input port, an optical signal comprising n wavelengths and splitting 404 the optical signal based on a polarization of the optical signal into a first optical signal with a first polarization and a second optical signal with a second polarization (the second optical signal can be rotated to have the same polarization as the first optical signal). The method 400 further comprise demultiplexing 406, by a first demultiplexer 104-1a, the first optical signal into n first outputs for each of the n wavelengths. The method 400 further comprising demultiplexing 408, by a second demultiplexer 104-1b, the second optical signal into n second outputs for each of the n wavelengths. The routing matrix 106 routes 410 each of the n first outputs and the n second outputs to n shared photodetectors 112a, b, c, . . . , n, wherein each photodetector of the n shared photodetectors 112a, b, c, . . . , n receives a first output of the first n outputs and a second output of the n second outputs, wherein the first output and the second output comprise the same wavelength. The waveguide combines 412 one of the first n outputs with a first wavelength and one of the n second outputs with the first wavelength at a photodetector of the n shared photodetectors into a combined signal. The photodetector photodetects 414 the combined signal.

In one aspect, the method 400 further comprises selecting the input from one of a plurality of selectable inputs.

In one aspect, the method 400 further comprises delaying, by a delay matching circuit 118, the n first outputs and the n second outputs such that the n first outputs and the n second outputs are arriving at the photodetector simultaneously.

In one aspect, wherein selecting the input is based on calculation, or based on prior knowledge of the device obtained through for example optical testing. In addition, selecting the input can be based on mechanical dimensions of the receiver based on prior measurements.

In one aspect, wherein combining one of the first n outputs with a first wavelength and one of the n second outputs with the first wavelength at the photodetector comprises merging the one of the first n outputs with a first wavelength and one of the n second outputs with the first wavelength from opposite sides of the photodetector.

In one aspect, wherein combining one of the first n outputs with a first wavelength and one of the n second outputs with the first wavelength at the photodetector comprises merging the one of the first n outputs with a first wavelength and one of the n second outputs with the first wavelength from the same side of the photodetector.

In one aspect, wherein combining one of the first n outputs with a first wavelength and one of the n second outputs with the first wavelength at the photodetector comprises merging the one of the first n outputs with a first wavelength and one of the n second outputs with the first wavelength into a multimode waveguide.

Having thus described several aspects and embodiments of the technology of this application, it is to be appreciated that various alterations, modifications, and improvements will readily occur to those of ordinary skill in the art. Such alterations, modifications, and improvements are intended to be within the spirit and scope of the technology described in the application. It is, therefore, to be understood that the foregoing embodiments are presented by way of example only and that, within the scope of the appended claims and equivalents thereto, inventive embodiments may be practiced otherwise than as specifically described. In addition, any combination of two or more features, systems, articles, materials, and/or methods described herein, if such features, systems, articles, materials, and/or methods are not mutually inconsistent, is included within the scope of the present disclosure.

In most embodiments, a processor may be a physical or virtual processor. In other embodiments, a virtual processor may be spread across one or more portions of one or more physical processors. In certain embodiments, one or more of the embodiments described herein may be embodied in hardware such as a Digital Signal Processor (DSP). In certain embodiments, one or more of the embodiments herein may be executed on a DSP. One or more of the embodiments herein may be programmed into a DSP. In some embodiments, a DSP may have one or more processors and one or more memories. In certain embodiments, a DSP may have one or more computer readable storages. In many embodiments, a DSP may be a custom designed ASIC chip. In other embodiments, one or more of the embodiments stored on a computer readable medium may be loaded into a processor and executed.

Also, as described, some aspects may be embodied as one or more methods. The acts performed as part of the method may be ordered in any suitable way. Accordingly, embodiments may be constructed in which acts are performed in an order different than illustrated, which may include performing some acts simultaneously, even though shown as sequential acts in illustrative embodiments.

The phrase "and/or," as used herein in the specification and in the claims, should be understood to mean "either or both" of the elements so conjoined, i.e., elements that are conjunctively present in some cases and disjunctively present in other cases.

As used herein in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified.

The terms "approximately" and "about" may be used to mean within ±20% of a target value in some embodiments, within ±10% of a target value in some embodiments, within ±5% of a target value in some embodiments, and yet within ±2% of a target value in some embodiments. The terms "approximately" and "about" may include the target value.

In the claims, as well as in the specification above, all transitional phrases such as "comprising," "including," "carrying," "having," "containing," "involving," "holding," "composed of," and the like are to be understood to be open-ended, i.e., to mean including but not limited to. The transitional phrases "consisting of" and "consisting essentially of" shall be closed or semi-closed transitional phrases, respectively.

Where a range or list of values is provided, each intervening value between the upper and lower limits of that range or list of values is individually contemplated and is encompassed within the disclosure as if each value were specifically enumerated herein. In addition, smaller ranges between and including the upper and lower limits of a given range are contemplated and encompassed within the disclosure. The listing of exemplary values or ranges is not a disclaimer of other values or ranges between and including the upper and lower limits of a given range.

The use of headings and sections in the application is not meant to limit the disclosure; each section can apply to any aspect, embodiment, or feature of the disclosure. Only those claims which use the words "means for" are intended to be interpreted under 35 USC 112(f). Absent a recital of "means for" in the claims, such claims should not be construed under 35 USC 112. Limitations from the specification are not intended to be read into any claims, unless such limitations are expressly included in the claims.

Embodiments disclosed herein may be embodied as a system, method or computer program product. Accordingly, embodiments may take the form of an entirely hardware embodiment, an entirely software embodiment (including firmware, resident software, micro-code, etc.) or an embodiment combining software and hardware aspects that may all generally be referred to herein as a "circuit," "module," or "system." Furthermore, embodiments may take the form of a computer program product embodied in one or more computer readable medium(s) having computer readable program code embodied thereon.

What is claimed is:

1. A receiver comprising:
    at least two input ports, wherein an optical signal containing n wavelengths is coupleable to only one of these input ports, wherein n>1;
    a first demultiplexer coupled to a first input port of the at least two input ports to separate n wavelengths in the first input port onto n first multiplexer output ports;
    a second demultiplexer coupled to a second input port of the at least two input ports to separate the n wavelengths in the second input port onto n second multiplexer output ports; and
    a waveguide crossing matrix comprising an input side and an output side, the waveguide crossing matrix coupled to the n first multiplexer output ports and the n second multiplexer output ports on the input side and coupled to n shared photodetectors on the output side, one for each wavelength channel, wherein each one of the n shared photodetectors is coupled to one of the n first multiplexer output ports for one wavelength channel and is coupled to one of the n second multiplexer output ports for the one wavelength channel.

2. The receiver of claim 1, wherein the waveguide crossing matrix is to group outputs for a given wavelength from demultiplexers coupled to the same input port, wherein the group of outputs of the same wavelength is input into the same photodetector.

3. The receiver of claim 1, further comprising:
    a third demultiplexer coupled to the first input port to separate n wavelengths in the first input port onto n third multiplexer output ports;
    a fourth demultiplexer coupled to the second input port to separate n wavelengths in the second input port onto n fourth multiplexer output ports;
    a first polarization beam splitter to split the optical signal into two signals based on polarization, the first polarization beam splitter comprising:
        an input coupled to the first input port; and
        a first output coupled to the first demultiplexer separating the n wavelengths for a first polarization; and
        a second output coupled to the third demultiplexer separating the n wavelengths for a second polarization; and
    a second polarization beam splitter to split the optical signal into two signals based on polarization, the second polarization beam splitter comprising:
        an input coupled to the second input port; and
        a first output coupled to the second demultiplexer separating the n wavelengths for the first polarization; and
        a second output coupled to the fourth demultiplexer separating the n wavelengths for the second polarization.

4. The receiver of claim 3, wherein the first polarization beam splitter comprises a rotator to convert the second polarization to the first polarization.

5. The receiver of claim 4, wherein the first demultiplexer is to receive a first signal for the first polarization of the optical signal from the first polarization beam splitter and wherein the third demultiplexer is to receive a second signal for the second polarization of the optical signal from the first polarization beam splitter.

6. The receiver of claim 2, wherein each input port of the input ports is coupled to two demultiplexers, a first demultiplexer for a first polarization of an optical signal and a second demultiplexer for a second polarization of the optical signal.

7. The receiver of claim 5, wherein the first signal with the first polarization and a wavelength and the second signal with the second polarization and the wavelength are combined at a photodetector of the n shared photodetectors corresponding to the wavelength.

8. The receiver of claim 3, further comprising a delay matching circuit to delay the output from the first demultiplexer and the output from the third demultiplexer, such that the output from the first demultiplexer and the output from the third demultiplexer for the same wavelength arrive at the photodetector simultaneously.

9. The receiver of claim 1, wherein a plurality of waveguides of the waveguide crossing matrix couple to the n shared photodetectors at different angles.

10. The receiver of claim 1, wherein a plurality of waveguides of the waveguide crossing matrix couple to the n shared photodetectors in a parallel configuration.

11. The receiver of claim 1, wherein each of the n shared photodetector further comprises a multimode waveguide, wherein a plurality of waveguides of the waveguide crossing matrix are merged into the multimode waveguides, wherein each of the multimode waveguides is coupled between the plurality of waveguides and a photodetector of the n shared photodetectors.

12. The receiver of claim 1, wherein a plurality of waveguides of the waveguide crossing matrix are divided into two groups for each photodetector based on polarization, wherein a waveguide is located on either side of each photodetector such that the waveguides illuminate the photodetector from two opposite sides.

13. The receiver of claim 1, wherein the waveguides are divided into two groups, such that the waveguides from the same pair of demultiplexers are on the same side of the photodetector.

14. A method of operating a receiver, the method comprising:
receiving, from an optical fiber coupled to an input, an optical signal comprising n wavelengths;
splitting the optical signal based on a polarization of the optical signal into a first optical signal with a first polarization and a second optical signal with a second polarization;
demultiplexing, by a first demultiplexer, the first optical signal into n first outputs for each of the n wavelengths;
demultiplexing, by a second demultiplexer, the second optical signal into n second outputs for each of the n wavelengths; and
routing each of the n first outputs and the n second outputs to n shared photodetectors using a waveguide crossing matrix, wherein each photodetector of the n shared photodetectors receives a first output of the first n outputs and a second output of the n second outputs, wherein the first output and the second output comprise the same wavelength.

15. The method of claim 14, selecting the input from one of a plurality of selectable inputs.

16. The method of claim 14, further comprising delaying the n first outputs and the n second outputs such that the n first outputs and the n second outputs are output simultaneously.

17. The method of claim 15, wherein selecting the input is based on a prior measurement of the receiver of mechanical dimensions or optical testing.

18. The method of claim 14, further comprising combining one of the first n outputs with a first wavelength and one of the n second outputs with the first wavelength at a photodetector by merging the one of the first n outputs with a first wavelength and one of the n second outputs with the first wavelength from opposite sides of the photodetector.

19. The method of claim 14, further comprising combining one of the first n outputs with a first wavelength and one of the n second outputs with the first wavelength at a photodetector by merging the one of the first n outputs with a first wavelength and one of the n second outputs with the first wavelength from the same side of the photodetector.

20. The method of claim 14, further comprising combining one of the first n outputs with a first wavelength and one of the n second outputs with the first wavelength at a photodetector by merging the one of the first n outputs with a first wavelength and one of the n second outputs with the first wavelength into a multimode waveguide.

* * * * *